July 13, 1926.
M. LEMOS
AUTOMOBILE TIRE VALVE
Filed March 20, 1925
1,592,607
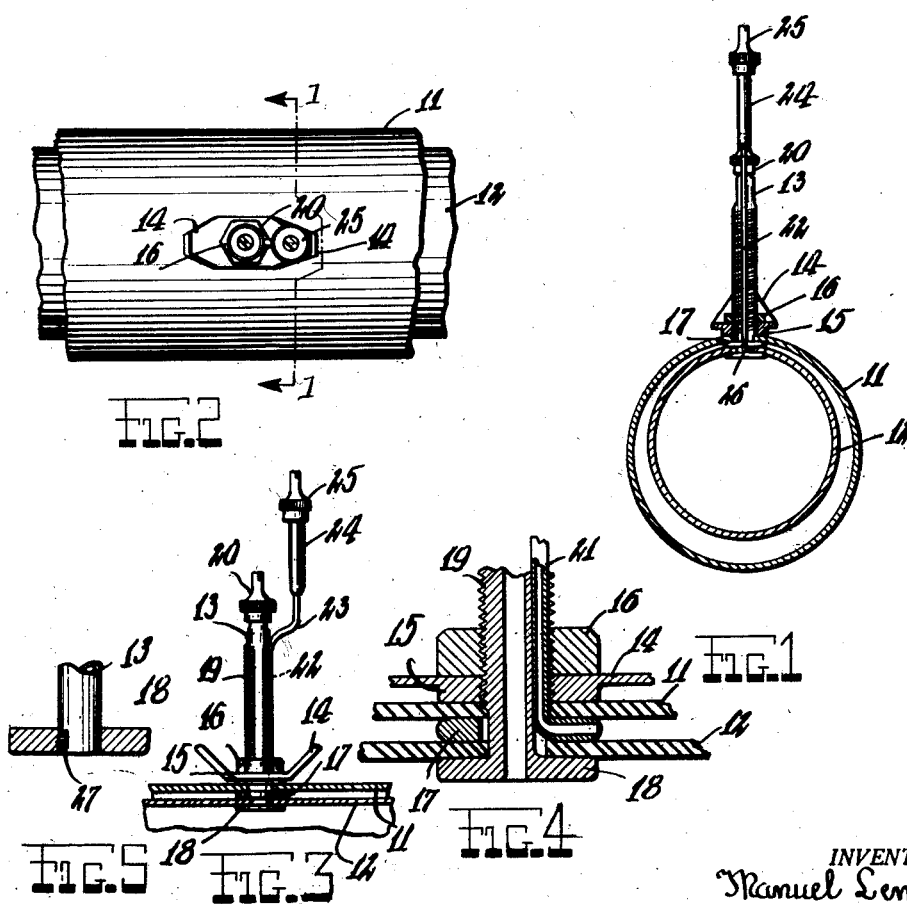
INVENTOR.
Manuel Lemos
BY
ATTORNEYS.

Patented July 13, 1926.

1,592,607

UNITED STATES PATENT OFFICE.

MANUEL LEMOS, OF NEW YORK, N. Y.

AUTOMOBILE TIRE VALVE.

Application filed March 20, 1925. Serial No. 16,923.

This invention relates to improvements in tire valves, and it is the principal object of the invention to provide a double-valve for the inflation of the outer tube in the customary manner, and comprising an auxiliary valve for inflating the inner tube.

Another object of the invention is the provision of a tire valve combined with the regular air valve allowing a separate inflation of the inner tube to prevent its flattening under the pressure of the air contained within the outer tube.

A further object of the invention is the provision of a double tire-valve allowing an inflation of the inner tube in order to prevent the rubbing of the same with the outer tube or coming into frictional contact therewith, and the consequent development of heat therein which is highly undesirable.

A still further object of the invention is the provision of a tire valve adapted to do away with the necessity of repairing the outer tube in case of punctures on the road thus avoiding all the inconveniences connected with repairs on the road and allowing a repair to be made at the end of a trip within the garage or the like protected locality.

The invention includes also novel and improved means for securing the valve to a tire.

These and other objects and advantages of the invention will become more fully known as the description thereof proceeds, and will then be specifically defined in the appended claim.

In the accompanying drawing, forming a material part of this disclosure:—

Fig. 1 is a sectional view of my improved inner tube equipped with a double valve constructed according to the invention taken on the line 1—1 of Fig. 2.

Fig. 2 is a fragmentary top plan view thereof.

Figure 3 is an elevation of the double tire valve showing part of the inner tube in section.

Fig. 4 is a greatly enlarged detail sectional view illustrating the manner of fastening the double valve to the tire.

Fig. 5 is a modified construction for fastening the valve stem to the foot rim.

In the drawing, the numeral 11 designates the tube which is normally used to expand an ordinary tire, which is equipped with an inner tube 12 and has attached thereto the air valve 13 the stem of which has the customary base plate 14 and ring washer 15 resting on the tube and held in position by the nut 16 in the usual well known manner. The stem extends through both tubes and is spaced from the walls thereof by the customary ring washer 17 and its inner end has a foot rim 18.

The outer face of the valve stem 13 is screw-threaded, as indicated at 19, and its upper end carries the customary cap 20. The inner construction of the valve is of a well known type and forms no part of the present invention. The threaded stem has a longitudinal groove 21 in its outer wall adapted to receive the stem of the auxiliary air valve designated 22 having a bent portion 23 and an upper straight portion constituting a stem for an auxiliary air-valve 24 closed at the top by a cap 25 and extending below into the inner tube, as indicated at 26.

In order to allow a removal of the valve stem 13, the same is secured to its foot rim 18 preferably by a pin and slot connection or bayonet connection 27 (Fig. 5).

The operation of the device will be entirely clear from the above description, if it is desired to inflate the tire, a small quantity of air is first introduced through the auxiliary valve 22 into the inner tube 12, and then the outer tube is inflated in the ordinary well known manner; it will be clear that the air contained in the inner tube will prevent a flattening of the same under the pressure maintained in the outer tube and thus prevent effectively a frictional contact between both tubes resulting in the so undesirable heating of the tires.

A further advantage obtained thereby will be the doing away with the necessity of exchanging the tires, when a puncture is experienced in the outer tube, on the road, it will simply be necessary to inflate the inner tube fully by means of the auxiliary valve and the car can then be driven to a garage or other protected locality in which the repair to the outer tube may be made with ease and convenience without the necessity of exposing the driver, for instance a lady, to the inclemencies of the weather on the road.

Changes may be made in the general arrangement of the valve and in the construction of the minor details thereof without departure from the scope of the invention as defined in the claim or without deviating from the spirit of the invention.

Having thus described my invention, what I claim as new and desire to protect by Letters Patent is:—

In a tire valve, a valve stem having a longitudinal groove in its outer wall adapted to receive the stem of an auxiliary valve.

In testimony whereof I have affixed my signature.

MANUEL LEMOS.